United States Patent [19]

Dahlberg et al.

[11] Patent Number: 5,355,611
[45] Date of Patent: Oct. 18, 1994

[54] BALANCER FOR FISHING RODS

[75] Inventors: Larry J. Dahlberg, Brainerd; John E. Brackett, Minneapolis, both of Minn.

[73] Assignee: Fishing Designs, Inc., Minneapolis, Minn.

[21] Appl. No.: 106,522

[22] Filed: Aug. 16, 1993

[51] Int. Cl.5 ................. A01K 87/00; A01K 97/10
[52] U.S. Cl. .................................. 43/21.2; 43/25
[58] Field of Search ............. 43/25, 23, 18.1, 21.2; 248/520, DIG. 910; 211/70.8

[56] References Cited

U.S. PATENT DOCUMENTS

| | | | |
|---|---|---|---|
| 2,232,107 | 2/1941 | Gall | 43/25 |
| 2,514,950 | 7/1950 | Harrington | 43/23 |
| 3,411,739 | 11/1968 | Barfield | 43/21.2 |
| 4,084,343 | 4/1978 | Genovese | 43/23 X |
| 4,467,548 | 8/1984 | Tabor | 43/23 |
| 4,738,046 | 4/1988 | Fraylick et al. | 43/23 X |
| 4,800,668 | 1/1989 | Burrough | 43/18.1 |

FOREIGN PATENT DOCUMENTS

| | | |
|---|---|---|
| 50-40787 | 4/1975 | Japan . |
| 53-77891 | 6/1978 | Japan . |
| 58-91285 | 6/1983 | Japan . |
| 63-174671 | 11/1988 | Japan . |
| 2-87463 | 7/1990 | Japan . |

*Primary Examiner*—P. Austin Bradley
*Assistant Examiner*—Jeanne M. Elpel
*Attorney, Agent, or Firm*—Moore & Hansen

[57] ABSTRACT

A counterweight assembly for balancing fishing rods utilizes an elongated, hollow butt cap mounted over the rear end of a fishing rod handle and supporting one or more counterweights internally or externally of the cap. The counterweights are selected as to weight increment and number so as to effectively balance fishing rods of different lengths about the fulcrum defined by the user's hand grip on the rod handle at the reel location.

16 Claims, 3 Drawing Sheets

BALANCER FOR FISHING RODS

BACKGROUND OF THE INVENTION

This invention relates to fishing rods, and more particularly to a counterweight assembly for balancing fishing rods.

A fishing rod, with reel attached, functions as a lever, with the fulcrum of the lever created by the user's hand grip which is located close to the butt end of the rod, far away from the rod tip end of the rod. The long distance of the rod tip from the fulcrum causes the rod's tip to exert downward rod tip force into and against the user's hand grip. The problem is that fishermen have a strong need and interest in "feeling" their bait and fish strikes with the rod tip, but because the rod is "tip heavy" much of what they feel is the downward force of their rod tip. The problem is that much of the fisherman's ability to feel his bait, bottom structure, and fish strikes is dampened and lessened by the downward force of his fishing rod tip. That force also creates an undesirable resultant upward force on the user's hand through the rod handle.

In the past, custom rod makers have inserted a lead paste or lead wire material inside of the rod blank at the butt end of the rod in an attempt to counterbalance the downward force of the rod tip; however, the problem is that the inside diameter of most rod blanks is too small to allow the lead paste counterbalance weight to be efficiently positioned at the butt end of the rod. Because of the small diameter of the blank, the lead paste must be inserted over a substantial portion of the length of the rod blank in order to add a significant amount of weight. As a result the lead paste approach adds too little counterbalance weight and adds it to the rod at a location too far forward to efficiently counterbalance the rod.

Japanese prior art discloses fishing rod constructions that have removable weight counterbalance assemblies permanently attached inside of the rear end of the fishing rod (No. 2-87463). The problem with these constructions is that these counterbalance assemblies can only be used on the rod with which they are constructed and will not accommodate other rods in general use. These counterbalance approaches are also inadequate as they afford no provision for adding small "fine tune" increments of counterbalance weight.

Japanese laid open No. 58-91285 discloses a removable counterbalance assembly which utilizes a clamping ring that is mechanically complicated and costly to manufacture and this assembly offers no provision for adjusting the amount of counterbalance weight for different rods and different uses. The cap itself comprises the weight.

Japanese laid open No. 50-40787 discloses a removable weighted butt cap which has a permanent weight attached to the inside of the butt cap. This rod counterbalance design offers no provision for the user to adjust the counterbalance effect with different sized weights and this counterbalance approach is disclosed with a construction that requires that he counterbalance assembly and the rod be manufactured to accommodate and match each other.

Japanese laid open No. 53-77891 discloses a counterbalance weight that is permanently attached to a fishing rod at the rear extremity of the rod handle and exactly equals the weight of the front portion of the rod. This approach makes no provision for counterbalance removability and makes no provision for small counterbalance weight adjustability.

None of the prior art fishing rod counterbalance approaches recognize the strong need for fishermen to precisely balance both their rod and reel to the balance point of the reel mounted on the rod and none of the prior art discloses or recognizes the need for small counterbalance weight increments. The smallest balance weight increment disclosed by the prior art is 25 grams, whereas in actual usage a counterbalance weight increment of six grams or less is sometimes needed to precisely balance a rod and reel to both the fisherman's hand grip and to the weight of the fisherman's reel. None of the prior art recognizes or discloses the desirability to balance both the user's rod and reel specifically to the user's grip and to the weight of either a casting reel or a spinning reel mounted on the rod. None of the prior art reflects an understanding of the technical details of the fisherman's need for a counterbalance component that will removably fit onto many different sized straight handled rods and that will also give the user almost infinite counterbalance adjustability for the various rods and reels used by the fisherman.

BRIEF SUMMARY OF THE INVENTION

This invention has as its primary objective the provision of a balancing component for a fishing rod and reel assembly which enables the fisherman to precisely balance existing rod and reels. This has the particular advantage of eliminating the downward rod tip force of present rods, and greatly increases the rod's sensitivity and the fisherman's ability to feel the bait on his line, as well as bottom structure and weeds and to quickly sense a fish striking a bait or lure.

A further objective is to provide such a counterbalance component as an accessory which may be adjustably and removably fitted onto the rear end of different sizes of fishing rod handles so as to provide almost infinite counterbalance weight adjustability.

A further objective is to permit the use of such a counterbalance component on different rods so as to be able to precisely adjust the counterbalance weight for different length rods, different style reels and different sizes of reels being used. The fisherman may also advantageously adjust the counterbalance weight for his specific grip location on the rod and reel.

The foregoing objectives are achieved by the use of a friction fit butt cap made of flexible material which may be removably secured over the rear end of fishing rod handles of different sizes and shapes. The butt cap is of elongated, generally cylindrical construction with a closed rear end and open front end defining a hollow or open interior. The side walls of the cap are sufficiently flexible to permit the cap to be inserted over the rear end of fishing rod handles. The cap has sufficient length, in the preferred embodiment, such that after the open end of the cap is fitted over the rear end extremity of a fishing rod handle in a friction fit therewith, there is a remaining space in the elongated interior of the cap to house one or more weights selectively utilized to achieve proper balance on a particular fishing rod and reel assembly being used by a fisherman. Rubber is the preferred material for the butt cap.

The aforesaid counterbalance weights are preferably made of lead and are cylindrical, coin or disk shaped. They are sized to fit readily but snugly within the interior of the hollow butt cap, between the closed rear end of the butt cap and the rear end extremity of a fishing rod handle on which the butt cap is mounted. The length of the butt cap is predetermined so that one or more balance weights will fit inside of the cap, with enough cap length remaining so that the cap's flexible side walls may extend a sufficient length over the rear end of a fishing rod handle so as to be securely retained in a friction fit therewith.

As a further advantageous feature, the outside surface of the side walls of the butt cap balancer taper inwardly from the rear, closed end thereof towards the opposite, open end. This construction provides the cap with progressively thicker walls towards the outer end extremity for greater strength over the portion thereof within which the counter weights are contained, and with resulting thinner wall thickness towards the front, open end of the butt cap to provide maximum flexibility for removable insertion over the end extremity of fishing rod handles. The side walls of the butt cap balancer are sufficiently flexible that they may fit over the rear end of handles which may have an enlarged diameter butt cap on them.

As a further beneficial feature, the closed, rear end wall of the butt cap is preferably provided with a through hole. This hole provides a vacuum release which facilitates the friction fit of the cap onto fishing rod handles, and also provides an aperture through which a pointed instrument may be inserted, if necessary, to assist in pushing the weights out of the butt cap when the weights are being removed or adjusted.

In a modified embodiment, the necessary counterbalance weight may be secured externally of the butt cap, against its rear end wall by a threaded engagement of an extension thereon with a threaded receiving member positioned inside of the butt cap, against the inside surface of the cap rear wall. The mating threaded extensions project through the aforesaid hole or aperture in the rear closure wall of the butt cap.

These and other objects and advantages of the invention will become readily apparent as the following description is read in conjunction with the accompanying drawings wherein like reference numerals have been used to designate like elements throughout the several views.

DESCRIPTION OF THE PREFERRED EMBODIMENTS

Figure 1:
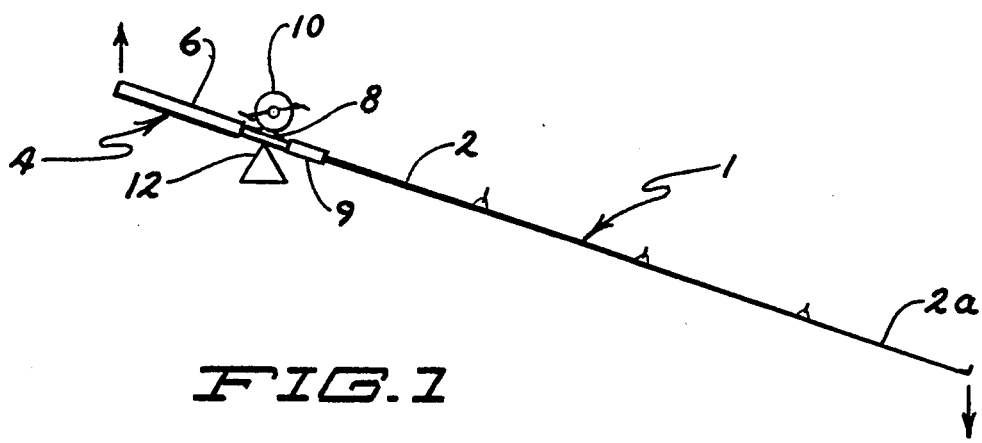
FIG. 1 is a schematic showing of a fishing rod, with the weight balance problem illustrated by directional arrows.

FIG. 1 illustrates schematically a fishing rod 1 of conventional design having an elongated rod 2 with a tip portion 2a and a handle generally indicated by reference numeral 4. The handle includes a butt grip 6 and a reel seat 8 on which a reel 10 is mounted. Handle foregrip 9 extends forwardly of reel seat 8. The fulcrum or balance point 12 for the rod will normally be as indicated, under the reel seat 8 when a fisherman is gripping the handle 4 in a normal position with fingers extending under the reel seat. In the palming grip mode in which the fisherman palms the reel and handle, with his thumb on top of the reel side plate, two or three fingers extend under the reel seat 8 and thus define the location of fulcrum 12.

Fishing rods have a natural tendency to be tip heavy. Thus, with no counterbalance weights of any kind utilized, the greater length and weight of rod portion 2 extending in front of fulcrum point 12 would cause the rod to tip downwardly as indicated by the directional arrow at the rod tip 2a. Because the rod is thus "tip heavy", much of what the fisherman feels when gripping the handle 4 is the downward force of the rod tip 2a. This makes it difficult for a fisherman to feel his bait and to sense a fish strike.

Figure 2:
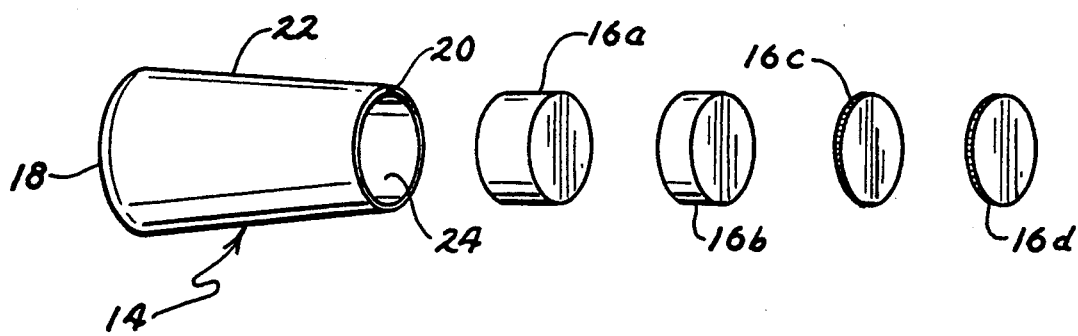
FIG. 2 is a perspective view of the counterbalance butt cap and associated weights of this invention.
Figure 3:
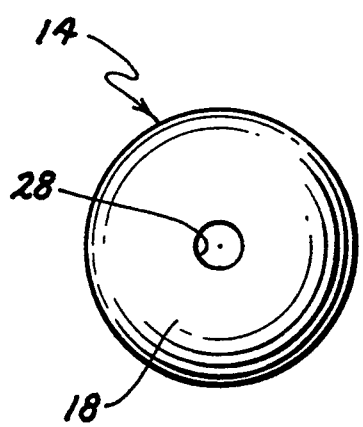
FIG. 3 is a rear end view of the butt cap.
Figure 4:
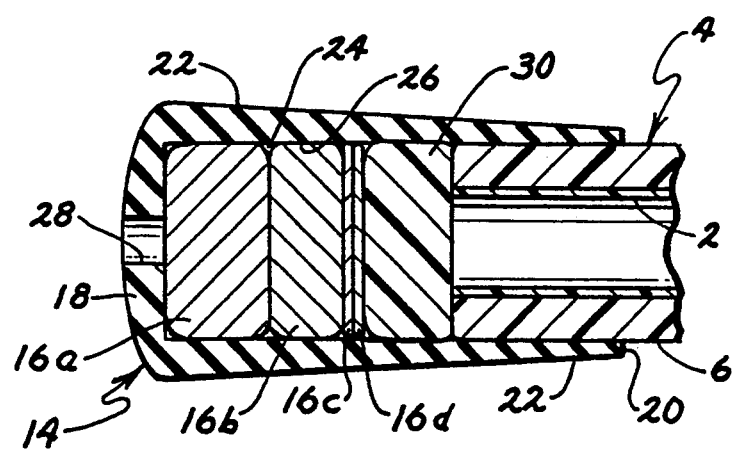
FIG. 4 is a fragmentary, side elevation view, partially in section, showing the butt cap and balance weight assembly mounted on the rear end of a fishing rod handle.

The aforesaid problem is overcome by the use of a counterbalance device readily attachable to the rear end of the butt grip 6 of the rod and preferably comprised of a butt cap 14 and a plurality of weights 16a-16d as illustrated in FIGS. 2-4. It is to be noted that the number and size of weights shown have been provided for illustrative purposes only. Different numbers and sizes of weights may be utilized to achieve the necessary balance on different types, styles and weights of fishing rod and reel assemblies.

As illustrated in FIGS. 2-4, the butt cap 14 is preferably of elongated, generally cylindrical shape, with a rear end closure wall 18 and an open front end 20 defined by curvalinear side walls 22. The butt cap 14 is preferably made out of flexible material, such as rubber. A preferred butt cap material is 50-70 derometer rubber. Although different sizes of butt caps may be utilized, the preferred aperture diameter at the open front end 20 of the butt cap is on the order of 1 inch. This aperture size and the flexible material enable the butt cap to be mounted in a friction fit over the rear, butt grip end of fishing rod handles which have a rear diameter size from 1 inch to 1¼ inch. The friction fitting of the butt cap on a fishing rod handle 4 may be improved by lubricating the inside of the rubber cap, as with talcum or baby powder.

The cylindrical side walls 22 and rear closure wall 18 of butt cap 14 define an interior, weight-containing compartment 24 as shown in FIGS. 2 and 4. Side walls 22 are of a sufficient, predetermined length, preferably on the order of between 2 inches and 3 inches, such that when butt cap 14 is slidably fitted over the butt grip 6 of a rod handle 14 in the manner illustrated in FIG. 4, there will be sufficient longitudinal space within compartment 24 so as to accommodate a plurality of counterbalance weights. Those weights 16a, 16b, 16c, and 16d will be snuggly, removably contained within compartment 24 between rear closure wall 18 and the rear end extremity of rod handle 4. As illustrated in FIG. 4, the rod assembly is of the type wherein the rod or rod blank 2 extends rearwardly through the handle 4 and its butt grip 6. In the embodiment illustrated in FIG. 4, the rod handle 4 is provided with a rear cap 30, against which the weights 16a–16d bear. The side walls 22 of the butt cap are sufficiently flexible as to readily slide over butt cap 30.

Figure 5:
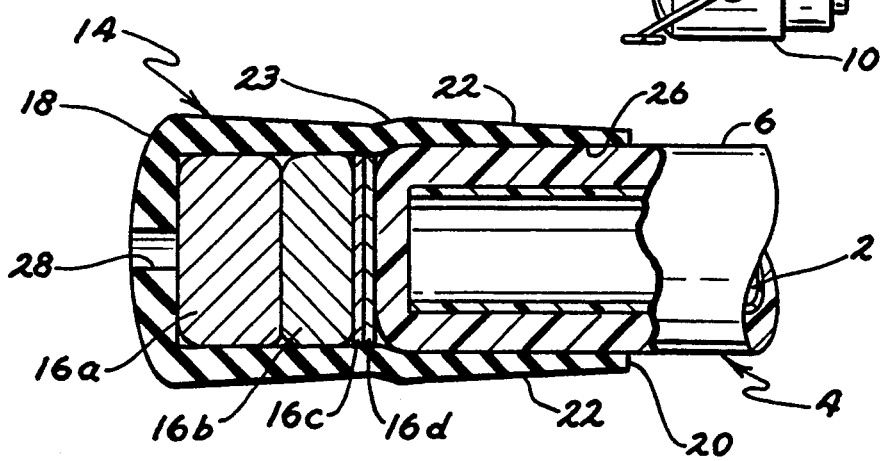
FIG. 5 is a side elevation view, with the butt cap and weights shown in section, similar to FIG. 6 but illustrating the distorted shape of the flexible side walls of the butt cap when it is mounted over a fishing rod handle having a larger diameter than that of the opening at the forward end of the butt cap.

The mounting and weight-containing functions of the butt cap 14 are further enhanced by tapering the outside surfaces of side walls 22 inwardly from the rear, closure wall 18 thereof towards the open front end 20 as clearly shown in FIG. 4. This construction provides thinner side walls on cap 14 towards the front end thereof, thereby providing greater flexibility on the forward portions of side walls 22 to facilitate their insertion over fishing rod handles. As illustrated in FIG. 5, even with a fishing rod butt grip 6 of greater diameter than the open end 20 of butt cap 14, the side walls 22 will flex outwardly as indicated at 23 so as to readily permit the slidable insertion of the weighted butt cap over the rear end of the butt grip portion of the handle 4. With the inside surfaces 26 of butt cap side walls 22 extending substantially straight, the side walls 22 will be progressively thicker towards the rear end extremity of the butt cap as illustrated. This construction provides the further advantage of greater side wall strength on butt cap 14 along the portions thereof which house the removable weights.

Figure 6:
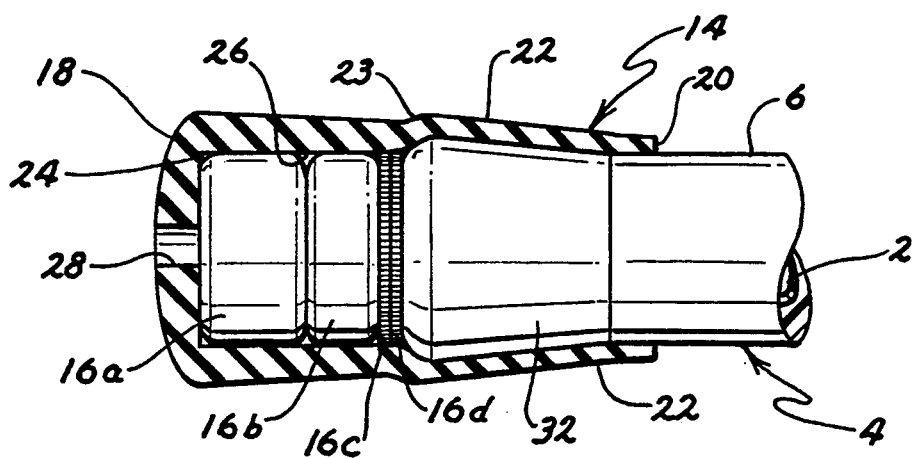
FIG. 6 is an additional side elevation view, with the butt cap and counterweight shown in section, and with the butt cap mounted over the rear end of a fishing rod handle having a cap on it which is of larger diameter than the fishing rod handle itself.

In the embodiment shown in FIG. 6, the butt grip 6 of rod handle 4 is provided with a larger, longitudinally extending rear end cap 32 which is of significantly larger diameter than the butt grip portion 6 of the rod handle. Even with such a rod construction, the elongated butt cap 14 may be readily, slidably mounted in place over the enlarged butt cap 32, with the side walls 22 of the cap flexing outwardly as indicated by reference numeral 23.

The counterbalance weights 16a–16d may be of various sizes, shapes, and materials. They are preferably dowel or cylindrical shaped and sized to removably fit inside of butt cap 14. The ideal material for the counterbalance weights is lead, but they could be made of other metal. In the preferred embodiment illustrated in FIGS. 2–6, one weight 16a is 2-½ ounces, a second weight 16b is 1-¼ ounces, and the smaller weights 16c and 16d may preferably comprise quarter coins, which weigh one-fifth ounce each. This totals 4.15 ounces. As hereinafter set forth, the combined weight of the counterbalance weights and that of the butt cap 14 is selectively utilized to balance rods of different lengths to a horizontal position about fulcrum 12. On some rods having a length of 6 feet 6 inches, for example, the 2-½ ounce weight 16a, plus the weight of the butt cap 14 (approximately one ounce effective weight), perfectly balances the rod with the reel attached. On some rods having a length of 7-½ ft., the 2-½ ounce weight 16a, and the 1-¼ ounce weight 16b, together with the weight of the butt cap, will bring the rod and reel assembly to a perfect balance. Any number of quarters 16c, 16d may be selectively inserted into the butt cap, in combination with the weights 16a and/or 16b in order to bring the rod and reel assembly to a perfect balance. On some rod and reel assemblies, the added weight of one quarter or 1/5 ounce is the significant difference which permits the attainment of a perfect balance. The removable butt cap 14, with the selectively insertable counterbalance weights, gives the user almost infinite weight adjustability to precisely counterbalance a very large variety of fishing rod and reel sizes, lengths, and styles.

As is illustrated in FIGS. 3–6, the rear, closure end 18 of the butt cap 14 is preferably provided with a through hole 28. This hole in the cap serves as an air release aperture to facilitate the forcing of the butt cap over the rear end of a fishing rod handle 4. Also, an elongated object, such as a pencil, may be inserted through hole 28 in order to assist in pushing the weights out of the butt cap 14, after it is removed from a fishing rod handle. As set forth below with respect to FIGS. 9–11, hole 28 also accommodates the insertion of the threaded connecting end of a weight which may be mounted externally of butt cap 14. Hole 28 is made large enough to accommodate a pencil or a screwdriver, and is preferably on the order of ¼ inch to 154 inch in diameter.

Figure 9:
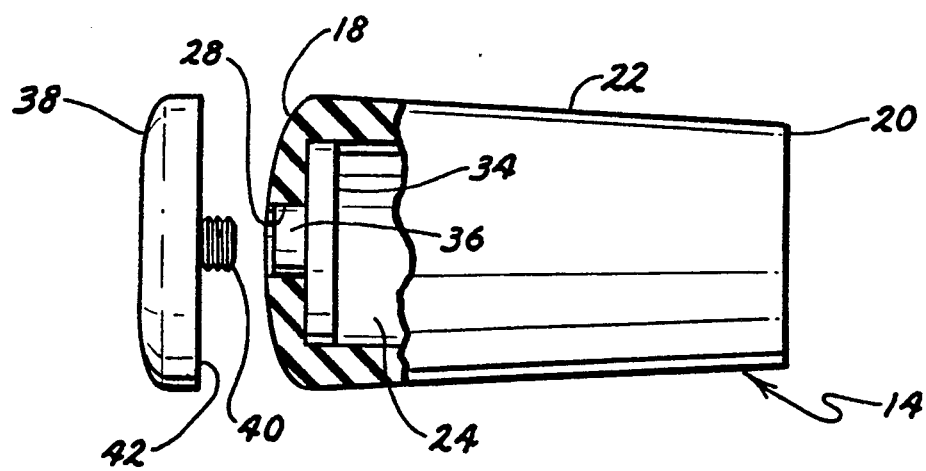
FIG. 9 is a side elevation, section view of an alternative embodiment of a counterbalance butt cap with an externally attachable balance weight shown in an exploded view.

The embodiment of FIG. 9 illustrates a further approach to the counterbalance assembly wherein an external weight may be attached to the butt cap against its read end wall. For this purpose, a threaded receiving member 34, which may take the form of a weld nut, is inserted inside of the butt cap, flush against the inside surface of rear closure wall 18 so that its internally threaded extension 36 projects inside of end wall aperture 18 as shown. A counterbalance weight of brass or other suitable metal 38 is provided with a forwardly protruding threaded stem 40. Thus, balance weight 38 can be secured to the outside surface of rear closure wall 18 of balance cap 14 by threadedly inserting projection 40 into threaded engagement with internally threaded extension 36 of receiving member 34. When so assembled, threaded stem 40 of weight 38 will be screwed into threaded receiver 34, within aperture 28 of butt cap 14, with the inside or forward wall surface 42 of weight 38 bearing against the outside surface of rear closure wall 18 of butt cap 14. The device of FIG. 9 thus gives the user the option of removably attaching counterbalance weight 38 externally to the rear end of balance cap 14. Weight 38 may be utilized to supplement the weights inserted internally of butt cap 14 within compartment 24 thereof, so as to precisely balance particular fishing rod and reel assemblies. Also, the use of external balance weight 38 permits utilizing fewer weights inside of butt cap 14, thus providing a longer, freely extending flexible wall portion at the forward end of the butt cap. This facilitates mounting of a butt cap in a tighter fit on some rod handles.

Figure 10:
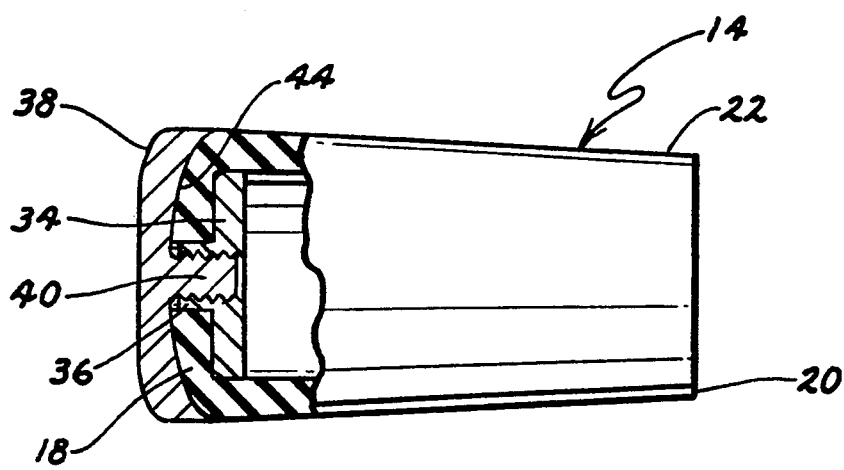
FIG. 10 illustrates a counterbalance butt cap embodiment similar to that of FIG. 9, with an attached, external balance weight contoured to conform to the rear wall curvature of the butt cap.

FIG. 10 illustrates an external counterweight 38 of the type shown in FIG. 9 mounted on the rear end of butt cap 14. As illustrated in FIG. 10, counterweight 38 may be provided with a concave surface 44 on its forward end which is shaped to conform to the curved, convex shape of rear end wall 18 of butt cap 14. This provides a snug fitting and attractive assembly of a rear, external counterweight 38 in combination with counterbalance butt cap 14.

Figure 11:
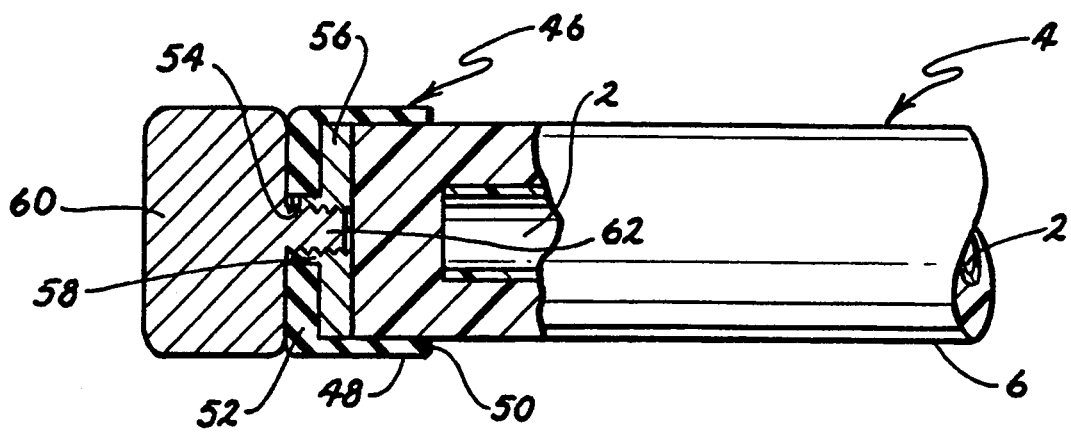
FIG. 11 illustrates in a side elevation, section view an embodiment similar to that of FIGS. 9 and 10, but with a shorter length butt cap and a larger counter weight.

In FIG. 11, a further embodiment has been illustrated in which an external weight may be utilized as the only counterbalance weight, in combination with a butt cap 46 slidably mounted in a friction fit over the rear end of the butt grip segment 6 of a fishing rod handle 4. In this version, the butt cap is also of cylindrical shape, and may be made of rubber or plastic, with side walls 48 and a closed rear end wall 52. The front end 50 of the butt cap is open for slidable mounting over the rear end of the fishing rod handle 4. An aperture or through hole 54 is again provided through the rear end wall 52 of the butt cap. In this version, the butt cap will preferably be permanently mounted on the rear end of butt grip 6 of fishing rod handle 4, as by gluing side walls 48 thereto. Side walls 48 are of a sufficient length to accommodate an internal, threaded receiving member 56 having an elongated, internally threaded projection 58. As with the embodiment of FIGS. 9 and 10, receiving member 56 is a nut, which may preferably take the form of a weld nut, with its internal threads on projection 58 defining a female, threaded opening which projects into rear aperture 54 on butt cap 46. A separate, removably attachable counterweight 60 of metal, such as brass, is machined or otherwise formed to the general configuration of a cylindrical shaped member 60 as shown in FIG. 11 with a forwardly projecting, externally threaded stem 62. Weight 60 may thus be removably secured to the rear end of a fishing rod handle by screwing its threaded stem 62 into the internally threaded, female aperture defined by projection 58 on receiving member 56. Weight 60 may be provided in different sizes and weight increments to achieve a desired balance on a fishing rod.

It is contemplated that the embodiment of FIG. 11 may find particular application as an attachment to fishing rods as supplied by fishing rod manufacturers, with butt cap 46 secured in place on the rod handle 4 by the manufacturer. Since butt cap 46 need only accommodate threaded receiving member 56, it is of a shortened length in comparison with the balance weight butt cap of FIGS. 2–10, and preferably will be on the order of ½ inch to 1 inch in length. Weight 60 may be on the order of 4 ounces, so as to be able to balance fishing rods having a length on the order of 6-½ feet, with no downward force at the rod tip. However, in situations where the fisherman is using artificial lures, such as so-called crank baits, and it is desired to fish with the rod tip down, rear weight 60 may be removed by simply unscrewing it.

Figure 7:
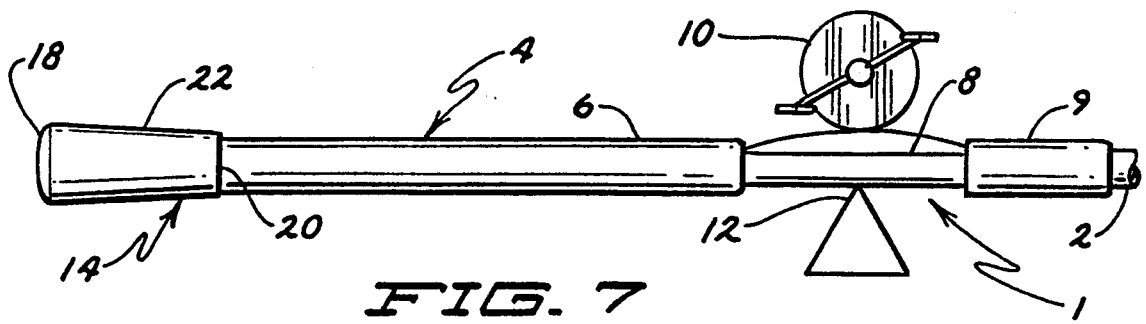
FIG. 7 is a schematic illustration of a bait casting rod and reel in a balanced position with the counterbalance butt cap of this invention mounted on the rear end of the rod handle.
Figure 7A:
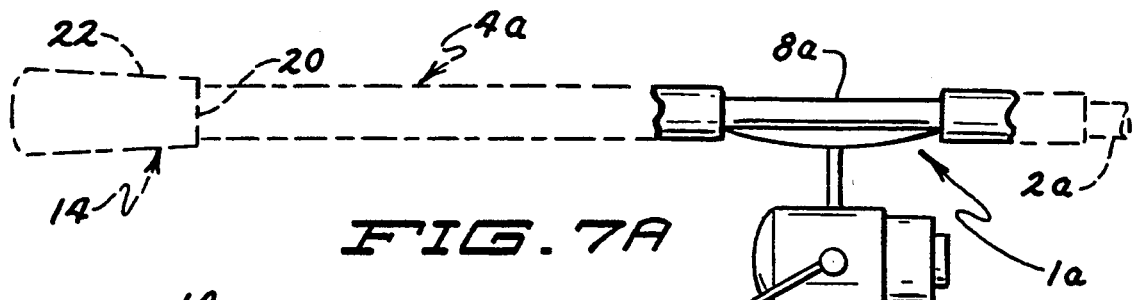
FIG. 7A is a view similar to FIG. 7, but illustrating a spinning rod and reel assembly in a horizontal, balanced position with the butt cap balancer of this invention mounted on the rear end of the handle.

FIGS. 7 and 7a illustrate schematically fishing rods having the counterbalancing butt weight assembly of this invention mounted on the rear end of the rod handle 4. FIG. 7 illustrates a rod of the bait-casting rod type wherein a bait-casting reel 10 is mounted on reel seat 8 of a handle 4 supporting a fishing rod or rod blank 2. With butt cap 14 in place, and counterweights in the preselected number and weight contained therein, the fishing rod and reel assembly 1 will be balanced in a horizontal position on fulcrum 12 as shown in FIG. 7.

FIG. 7A illustrates schematically the mounting of balancing butt cap 14 on the rear end of the handle 4a of a spinning rod and reel assembly 1a. Such a rod and reel assembly has an elongated fishing rod 2a with a reel seat 8a from the bottom of which a spinning reel 10a is mounted as shown. Butt cap 14, with any of the internal and/or external weight configurations disclosed herein, may be utilized with equal effectiveness on the rear end of spinning rod handle 4a to balance that rod and reel assembly about fulcrum 12.

Figure 8:
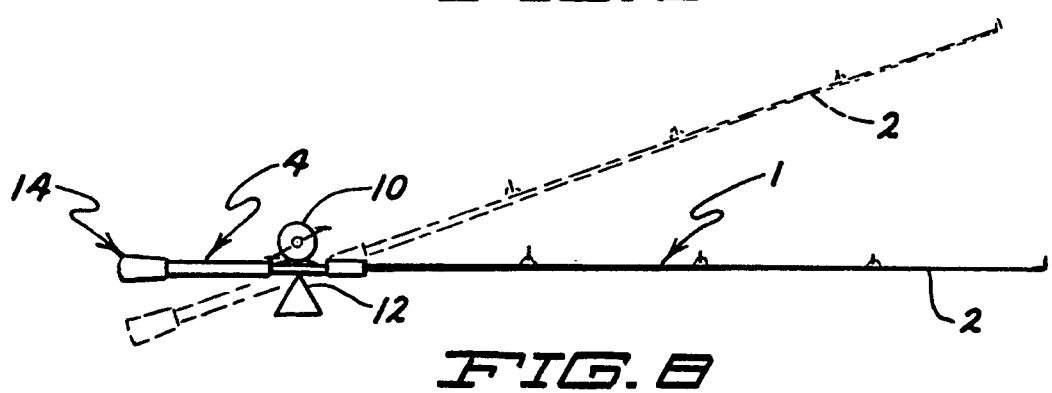
FIG. 8 is a schematic illustration showing how a fishing rod and reel assembly would balance at different angles of inclination from the horizontal, depending on variations in the rod length and/or balance weight utilized.

FIG. 8 illustrates the bait-casting rod and reel assembly 1 of FIG. 7 in different angular positions, depending upon the combination of rod length and/or total counterbalance weight utilized. As shown in solid lines in FIG. 8, the rod and reel assembly 1 is in a horizontally balanced position on fulcrum, balance point 12. That would be the case, for example, with a total balance weight of 4 ounces on the rear end of rod handle 4, on such a rod and reel assembly having a total length of 6-½ ft. If, however, that same total amount of balance weight were utilized on a shorter rod, such as a 6 ft. rod, the shorter length of forward lever arm defined by the length of fishing rod 2 between its tip and fulcrum point 12 would produce a lesser downward force on the forward end of the rod, with the result that the same counterbalance weight of 4 ounces would cause an upward force at the rod tip indicated by the directional arrow. The rod would thus tip upwardly at its front end to an inclined position of approximately 30° as shown in phantom lines in FIG. 8, at which the rod would reach its balance point. In some instances, it may be preferable to balance the rod in a slightly inclined position.

The following table shows the effect of different total butt weights on a fishing rod and reel assembly. The weights shown are for a rod having an overall length of approximately 6-½ feet. That is a common commercial length for rod and reel assemblies.

| BUTT WEIGHT | TIP FORCE | DIRECTION |
| --- | --- | --- |
| Zero | ¾ oz. | Down |
| 2 oz. | ½ oz. | Down |
| 4 oz. | Zero | |
| 6 oz. | 1/5 oz. | Up |

Thus, with no balance weight of any kind utilized, there would be a downward force at the rod tip of approximately ¾ of a ounce. The next example shows that with a balance weight of 2 ounces, there would be a downward force at the rod tip of approximately ½ ounce. With a balance weight of 4 ounces on the rod handle, the forces at the rod tip are balanced, with the rod being balanced in a horizontal position. The last example indicates that with a balance weight of 6 ounces on the rod handle, at the butt grip end, there would be a resultant force in an upward direction at the rod tip of approximately 1/5 of an ounce. The rod tip can thus be perceived as having an upward, downward, or neutral force acting on it. The rod length from the fulcrum point to the rod tip, the length of the rod handle, and the balancer weight utilized, all determine the balance point of a particular rod and reel assembly. The angle at which the rod is to be balanced also effects the amount of downward force perceived at the rod tip, and the amount of counterbalance weight required on the handle. If a rod is to be balanced in an upwardly inclined position, then the effective tipping moment of the rod length from the fulcrum point to the rod tip is reduced, and thus a lesser amount of balance weight would be required to balance the rod in an upwardly inclined position from the horizontal.

As noted above, a total balance weight of approximately 4 ounces has been determined for balancing many rod and reel assemblies on which the rod length is approximately 6-½ ft. Since the butt cap 14 itself provides an amount of weight, on the order of 1 to 1-¼ ounces, a total, effective balancing weight of 4 ounces can be provided by utilizing a single weight 16a of 2-½ ounces in combination with the butt cap and a single quarter, adding a weight of 1/5 ounce. This would provide a total weight of 3.95 ounces. Any combination of the removably insertable and externally attachable weights may be utilized as desired to balance a particular fishing rod and reel assembly. It is contemplated that the balancer device disclosed herein in its various embodiments will be effective to balance fishing rods from 4-½ ft. to 8 ft. or more in length, including both spinning rods and bait-casting rods.

In addition to increasing the user's feel for strikes, the elimination of the downward force on the rod tip by balancing the rod also removes the resultant upward force on the rod handle, and thus the fatigue on the user's hand normally encountered.

It is contemplated that various changes may be made in the construction, size, shape and assembly of the butt cap balancer and removable weights disclosed herein without departing from the spirit and scope of the invention as defined by the following claims.

What is claimed is:

1. A removable, counterbalancing, butt cap assembly for fishing rods comprising:

an elongated butt cap adapted to be slidably mounted over the rear end portion of fishing rod handles, said butt cap being of a substantially cylindrical, hollow configuration with a closed rear end wall and an open front end spaced apart at opposite ends of generally cylindrical side walls a sufficient distance so as to define an interior, weight-containing compartment between said closed rear end wall and the external rear end extremity of a fishing rod handle, when the butt cap is partially, slidably positioned over the outside of the rear end portion of the rod handle, said butt cap side walls being flexible, thereby permitting the butt cap to be slidably mounted over fishing rod handles of varying diameter and shape; and at least one counterweight contained within said weight-containing compartment for achieving a desired counterbalance against the weight of the rod forward length extending between the fulcrum created by the user's hand grip on the rod and the rod tip.

2. The butt cap assembly of claim 1 wherein:
said at least one counterweight is removably contained within said weight-containing compartment, whereby a counterweight of predetermined size and weight measure may be selectively inserted within said weight-containing compartment in order that a fisherman may precisely balance the fishing rod being used for the particular rod length and size and style of reel on the rod.

3. The butt cap assembly of claim 2 wherein:
a plurality of preselected counterweights are removably contained within said weight-containing compartment.

4. The butt cap assembly of claim 3 wherein:
said plurality of counterweights comprises at least one counterweight of one ounce or more and at least a second counterweight of one-fifth ounce or less.

5. The butt cap assembly of claim 3 wherein:
said plurality of counterweights comprises at least one counterweight of one ounce or more and at least a second counterweight of two ounces or more.

6. The butt cap assembly of claim 1 wherein:
said interior, weight-containing compartment is at least two inches in length.

7. The butt cap assembly of claim 1 wherein:
said butt cap is made of rubber and said side walls are adapted to be slidably mounted on fishing rod handles in a friction fit therewith.

8. The butt cap assembly of claim 1 wherein:
said butt cap side walls are tapered inwardly in a direction from said closed rear end wall towards said open front end thereof and gradually decrease in thickness in that direction, wherein the side walls will be thinnest along the portions thereof adjacent to said open front end, thereby enhancing the flexibility of those portions of the side walls for ease of mounting on fishing rod handles.

9. The butt cap assembly of claim 1 wherein:
a lubricant is on the interior surface of the side walls of the butt cap.

10. A counterbalancing butt cap assembly for fishing rods comprising:

an elongated butt cap adapted to be mounted over the rear end portion of a fishing rod handle, said butt cap being of a substantially cylindrical, hollow configuration with a closed rear end wall and an open front end spaced apart at opposite ends of generally cylindrical side walls;

a hole extending through the rear end wall of said butt cap;

a weight receiving and securing member contained inside of the butt cap adjacent to the rear end wall and having an internally threaded aperture in alignment with said through hole in the rear end wall of the butt cap; and a counterbalance weight of predetermined weight magnitude removably secured externally of the butt cap adjacent to the outside surface of the rear end wall thereof, said counterweight having a forwardly projecting stem with external threads thereon projecting into said hole in the rear end wall in threaded engagement with the internal threads on said receiving member.

11. The butt cap assembly of claim 10 wherein: the rear end wall of said butt cap is convex, and the forward adjacent surface of the counterweight is concave, whereby said counterweight abutts against the rear end wall of the butt cap in snug, conforming relation thereto.

12. A counterbalancing, butt cap assembly on a fishing rod having a handle with a reel mounted thereon, the handle having a transverse member on its rear end, comprising:

an elongated butt cap mounted over the rear end portion of the fishing rod handle, said butt cap being of a substantially cylindrical, hollow configuration with a closed rear end wall and an open front end spaced apart at opposite ends of generally cylindrical side walls a sufficient distance so as to define an interior, weight-containing compartment between said closed rear end wall and the transverse member on the rear end of the fishing rod handle, with the butt cap partially positioned over the outside of the rear end portion of the rod handle, and said butt cap side walls being flexible to facilitate slidable mounting of the butt cap on the fishing rod handle; and at least one counterweight contained within said weight-containing compartment for achieving a desired counterbalance against the weight of the rod forward length extending between the fulcrum created by the user's hand grip on the rod handle and the rod tip.

13. The butt cap assembly of claim 12 wherein: said butt cap is removably mounted on the fishing rod handle; and said at least one counterweight is removably contained within said weight-containing compartment, whereby a counterweight of predetermined size and weight measure may be selectively inserted within said weight-containing compartment in order that a fisherman may precisely balance the fishing rod being used for the particular rod length and size and style of reel on the rod.

14. A removable, counterbalancing, butt cap assembly for fishing rods comprising:

an elongated butt cap adapted to be slidably mounted over the rear end portion of fishing rod handles, said butt cap being of a substantially cylindrical, hollow configuration with a closed rear end wall and an open front end spaced apart at opposite ends of generally cylindrical side walls a sufficient distance so as to define an interior, weight-containing compartment between said closed rear end wall and the external rear end extremity of a fishing rod handle, when the butt cap is partially, slidably positioned over the outside of the rear end portion of the rod handle;

a hole extending through said rear end wall of said butt cap to serve as an air release aperture when forcing the butt cap over the rear end portion of a fishing rod; and at least one counterweight contained within said weight-containing compartment for achieving a desired counterbalance against the weight of the rod forward length extending between the fulcrum created by the user's hand grip on the rod and the rod tip.

15. A removable, counterbalancing, butt cap assembly for fishing rods comprising:

an elongated butt cap adapted to be slidably mounted over the rear end portion of fishing rod handles, said butt cap being of a substantially cylindrical, hollow configuration with a closed rear end wall and an open front end spaced apart at opposite ends of generally cylindrical side walls a sufficient distance so as to define an interior, weight-containing compartment between said closed rear end wall and the external rear end extremity of a fishing rod handle, when the butt cap is partially, slidably positioned over the outside of the rear end portion of the rod handle;

at least one counterweight contained within said weight-containing compartment for achieving a desired counterbalance against the weight of the rod forward length extending between the fulcrum created by the user's hand grip on the rod and the rod tip; and a rear counterweight secured to the outside surface of said rear end wall of said butt cap.

16. The butt cap assembly of claim 15 wherein:

said rear counterweight has a threaded stem projecting therefrom, a through hole is formed in said rear end wall, and a threaded attachment member is positioned inside of the butt cap adjacent to the rear end wall, and said threaded stem extending through said hole in mating, threaded engagement with the threaded attachment member.

* * * * *